3,342,874
POLYFLUORINATED NITROSOALKANES
Charles W. Taylor, St. Paul Park, Minn., assignor to Minnesota Mining and Manufacturing Company, St. Paul, Minn., a corporation of Delaware
No Drawing. Filed June 5, 1961, Ser. No. 114,644
1 Claim. (Cl. 260—614)

This application is a continuation-in-part of my copending application Ser. No. 101,655, filed Apr. 10, 1961, and now abandoned.

This invention relates to fluorinated nitrosoalkanes and to a process for their production.

It is known that trifluoronitrosomethane can be produced in small yield by reacting a mixture of silver trifluoroacetate with nitrosyl chloride, heating to remove excess nitrosyl chloride, and pyrolysis of the residue (e.g., J. Banus, Journal of the Chemical Society, 1953, pages 3755–3761).

It has now been found that superior yields of trifluoronitrosomethane, of the order of 3 to 4 times those previously known, can be obtained by pyrolysis of purified nitrosyl trifluoroacetate, according to the process of the invention. It has also been found that higher fluorinated nitrosoalkanes can be obtained by the same procedure.

An object of this invention is to provide a process for producing nitrosyl polyfluoroacylates.

Another object is to provide certain nitrosyl perfluoroacylates in purified form.

A still further object of the invention is to provide a process for the production of trifluoronitrosomethane.

Another object is to provide a process for the production of polyfluorinated nitrosoalkanes.

Still other objects will become evident hereinafter.

Broadly speaking, and in accordance with the above and other objects of the invention, it has been found that nitrosyl fluoroacylates are produced in yields up to 90 percent or more of theoretical by the reaction of a nitrosyl halide with certain heavy metal salts of polyhaloalkanoic acids; the nitrosyl fluoroacylates can then be pyrolyzed to give excellent yields of the corresponding fluorinated nitrosoalkanes.

The process for the production of substantially pure nitrosyl fluoroacylates is carried out under anhydrous conditions, at temperatures in the range of about $-80°$ to $+100°$ C.

The nitrosyl fluoroacylates thus prepared (which may also be designated as polyfluoroacylnitrites) are readily isolated in stable, substantially pure form from the reaction mixture by removing the insoluble inorganic salts and then purifying the desired product, e.g. by distillation under reduced pressure at temperatures below about 100° C.

The heavy metal salts which can be employed in the process are the silver, lead, and mercury salts of polyhaloalkanoic acids, which acids are exemplified by the acids having the formulae:

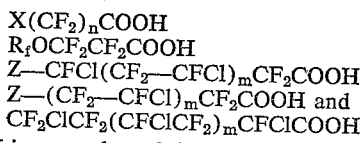

wherein X is a member of the group consisting of hydrogen, chlorine and fluorine; Z is a perhalomethyl radical having a total atomic weight not greater than 146.5; $R_f$ is a perfluoroalkyl radical having from 1 to 8 carbon atoms; $n$ is an integer from 1 to 12; and $m$ is a number from 0 to 5.

The fluorinated radicals attached to the carboxyl group in each of the above formulae are sometimes hereinafter referred to collectively and inclusively as $Q_f$.

The simplest group of salts is that derived from acids of the formula $R'_fCOOH$, wherein $R'_f$ represents a perfloroalkyl group having from 1 to 12 carbon atoms.

The acids described above are strong, salt-forming acids and the salts employed herein are readily prepared from the acids by reaction with silver oxide, silver carbonate, lead carbonate, lead II oxide, mercuric acetate, mercuric oxide, and the like.

The formulae $Z(CF_2CFCl)_mCF_2COOH$ and $$Z—CFCl(CF_2CFCl)_mCF_2COOH$$

are typical of acids derived from oxidation and hydrolysis of polymers including halogenated telomers of perhalogenated monomers as chlorotrifluoroethylene and the like with certain telogens.

Telomers produced using bromotrichloromethane as a telogen ultimately yield (after oxidation) acids having a terminal trichloromethyl group. Telomers produced using perhalomethanes other than bromotrichloromethane as telogens also yield acids corresponding to the above formulae. The requirement is that the telogen contain a bromine atom and not produce, at the end of the telomer molecule opposite the bromine atoms, an end group which is more easily hydrolyzed than the CFClBr end group which is readily converted to a carboxylic acid end group during oxidation of the telomer. Suitable telogens other than bromotrichloromethane are the perhalogenated methanes: bromotrifluoromethane, bromochlorodifluoromethane, bromodichlorofluoromethane, dibromodifluoromethane, and dibromochlorodifluoromethane. All of these latter telogens produce telomers containing a CFClBr group at one end of the molecule and containing at the opposite end a perhalomethyl group, that is, a Z group which is not more susceptible to hydrolysis than the aforesaid CFClBr group. Respectively the Z groups are $CF_3$, $CClF_2$, $CFCl_2$, $CBrF_2$, $CFBrCl$. For convenience, these perhalomethyl terminal groups may be designated collectively as those having a total atomic weight not higher than 146.5, the atomic weight of the bromochlorofluoromethyl group.

These telomers can be oxidized and hydrolyzed, as with fuming sulfuric acid, as described in United States Patents 2,806,665 and 2,806,666, to yield a variety of polyfluorinated acids. Oxidation of the polymers as described in United States Patent 2,863,916 also yields polyfluorinated acids of this type. All of such polyfluorinated acids are useful for the purposes of this invention.

The nitrosyl halides which can be employed are exemplified by nitrosyl chloride and nitrosyl bromide. The nitrosyl halide is employed in at least stoichiometrically equivalent amount. Preferably, an excess of the nitrosyl halide is used.

When M represents the heavy metal having a valence $p$, Y represents a halogen of the group consisting of chlorine and bromine, and $X(CF_2)_n$— represents a fluoroalkyl group as defined above, the general reaction is exemplified by the equation:

It will be understood that the heavy metal salts of the other acids exemplified by the formulae set forth hereinabove undergo the same reaction, the corresponding nitrosyl compound being formed.

For workup of the products of the foregoing process, it is sometimes found convenient to add a suitable inert diluent, for example, a low molecular weight halogenated hydrocarbon of the type of chlorotrifluoromethane, and the like, to facilitate separation of the precipitate of heavy metal halide. The solvent may be recovered by distillation under reduced pressure, together with the excess of nitrosyl halide, and reused in a subsequent preparation. The use of a diluent in this fashion is particularly desirable when the lead salts are employed, since it then permits substantially complete separation of the nitrosyl polyfluoroacylate from the lead halide.

The nitrosyl polyfluoroacylates of the invention are yellow liquids which can be distilled under reduced pressures at temperatures below about 100° C. In general, the boiling points of these liquids at atmospheric pressure are above the temperatures at which they are pyrolyzed to form the corresponding nitrosopolyfluoroalkanes, according to the reactions:

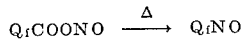

in which $Q_f$ represents polyfluorinated radicals having about 1 to 12 carbon atoms, as described in more detail in the formulae set forth hereinabove. They are, however, stable at room temperature, about 25° C., for indefinite periods and even at 100° C. for periods of at least a few hours. In respect to stability the fluorinated nitrosyl acylates are quite different from the nitrosyl hydrocarbon acylates, the behavior of which is described by Francesconi and Cialdea in Gazzeta Chemica Italiana, v. 34, part I; page 435 (1904). They are not apparently affected by light of ordinary intensities for prolonged periods, although storage in tinted glass or opaque containers is preferable as a precaution. If overheated, i.e., at temperatures above about 110° C., the pure undiluted materials may decompose violently. However, their stability, their preparation by the methods of the invention and their facile conversion to the corresponding nitrosopolyfluoroalkanes is brought about by the replacement of a majority of the hydrogen atoms in the alkane moiety by fluorine.

The nitrosyl polyfluoroacylates of the invention react vigorously with water and hydroxylated solvents, e.g., alcohols, to form the corresponding polyfluoroalkanoic acid. They react readily with sodium chloride to form nitrosyl chloride and, therefore, in determining the infrared absorption spectra of these compounds it is necessary to employ cells having silver chloride windows. The compounds exhibit infrared absorption maxima at about 5.07 and 5.85 microns which correspond to nitrosyl and carbonyl groups, respectively.

The compounds are also very reactive with metals. For example, they react with metals such as zinc, lead, aluminum, nickel, iron, mercury, copper and silver to form the salt of the polyfluoroalkanoic acid. They do not react with platinum, and hence platinum or platinum-lined equipment can be used in working with the compounds.

It has been found that the nitrosyl polyfluoroacylates of the invention react vigorously with many metallic chlorides to form nitrosyl chloride and the salt of the corresponding polyfluoroalkanoic acid. It is evident from the following exemplary equation:

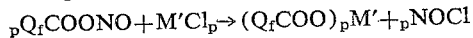

wherein M' represents the metal of valence $p$, and $Q_f$ has the significance set forth hereinabove, why such metals would generally not be useful in the process for preparation of the nitrosyl fluoroacylates themselves. The equilibrium in this reaction lies so far to the right that the nitrosyl fluoroacylates would be present only in minor amount. Metals whose chlorides react with these compounds include the alkali and alkaline earth metals, such as sodium, lithium, and barium, as well as zinc, cadmium, iron, aluminum, and the like.

The purified nitrosyl perfluoroacylates of the formula:

wherein $R'_f$ has the same significance as set forth above, as produced by the process of the invention, are free from metallic and chlorinated by-products and are substantially stable at temperatures below about 100° C. They are particularly useful as intermediates for the preparation of the corresponding perfluoronitrosoalkanes. These compounds can be termed nitrosyl perfluoroacylates substantially free from metallic and chlorinated by-products to distinguish them from the crude mixtures heretofore described. Pyrolysis of these substantially pure nitrosyl compounds produces the corresponding perfluoronitrosoalkanes in good yield.

While the presence of chlorine-containing compounds during pyrolysis, as in the previously known process for making trifluoronitrosomethane, causes the formation of partially chlorinated by-products, the process of the present invention is free from the disadvantage of this side-reaction, which severely affects the yield.

The scope of the invention comprehends a generally applicable process for the production of polyfluoronitrosoalkanes. Broadly speaking, this process is carried out by heating a mixture of the selected nitrosyl polyfluoroacylate in diluted condition at a temperature in the range of about 110° C. to 250° C. for a time sufficient to bring about a significant conversion to the nitroso compound by pyrolytic decarboxylation.

The dilution of the nitrosyl compound serves to moderate and control the reaction in such a way that explosions are avoided and smooth, safe, continuous operation of the process for extended periods of time is possible. Accordingly, the amount of the nitrosyl perfluoroacylate used is a fraction of the total amount of reactant plus diluent. Thus, about 10 percent or more, by volume, of inert diluent gas can be used with the nitrosyl polyfluoroacylate in vapor form; i.e., the partial pressure of the reactant in the gas mixture ranges up to about 90 percent of the total pressure. Pressures less than or greater than atmospheric can be used.

Preferably, the partial pressure of the reactant is maintained at not more than about 80 percent of the total pressure. At atmospheric pressure, the partial pressure of the nitrosyl polyfluoroacylate is in a preferred procedure maintained at up to about 600 mm. of mercury. Lower partial pressures can be used but it will be apparent that the process becomes less efficient at very low partial pressures. Thus, below 5 percent by volume of reactant, the removal of the product from the gas mixture becomes quite difficult because of the large volumes of inert diluent which must be dealt with.

Diluents which can be employed include such gases as nitrogen, helium and carbon dioxide; these gases are inert for the purposes of the pyrolysis. Alternatively, but somewhat less conveniently, the pyrolysis can be conducted in vacuo, and presures up to about 600 mm. of mercury can be employed (90 percent of atmospheric). In this way the reduction of pressure without the addition of diluent gas is seen to be the equivalent of dilution. Inert liquids, which are stable at the temperatures used, and which are heated to the selected temperature, also work as diluents; e.g. tri(perfluorobutyl)amine, perfluoroisooctane, and the like.

Although the pyrolysis can be effected at somewhat lower or higher temperatures, a temperature in the range of about 150° C. to 200° C. is preferred for the reaction. By passing the mixture of reactant and diluent gases through a tube heated to this temperature, the process can be made continuous. The desired product is readily isolated from the reaction mixture, which contains the co-product carbon dioxide and minor by-products such as carbonyl fluoride, oxides of nitrogen and polyfluoronitroalkanes. Unreacted starting materials can be recycled if desired. Conversion of the nitrosyl compound to the polyfluoronitrosoalkane can be followed by visual observation, because of the blue color of the desired product.

The nitroso polyfluoroalkanes can be recovered from the reaction mixture by condensation of the total product, washing with alkali to remove carbon dioxide and other acidic materials and distillation. In cases where the carbon dioxide does not interfere with distillation, the alkali wash may be eliminated.

The nitrosopolyfluoroalkanes are useful comonomers with halogen-containing olefins for the preparation of elastomers having advantageous properties. For example, the copolymer of trifluoronitrosomethane and tetrafluoroethylene is a rubber with good low-temperature flexibility and solvent resistance.

Now having described the process and compounds of the invention in broad terms, they are more specifically illustrated by means of particular examples serving to show the best mode presently contemplated of carrying out the invention without thereby limiting the same. In these examples all parts are by weight except where otherwise specified.

*Example 1*

Sixty-five parts of nitrosyl chloride (i.e., 1.0 mole) are distilled from a reservoir into a round-bottomed flask containing 138 parts (i.e., 0.623 mole) of dry finely powdered silver trifluoroacetate while cooling in Dry Ice-acetone. The resulting slurry is allowed to warm to about $-20°$ C. and is maintained at that temperature for 2 hours with occasional vigorous stirring by shaking or swirling of the flask. The excess nitrosyl chloride is removed by permitting the reaction mixture to warm to room temperature and collecting the nitrosyl chloride in a suitably cooled trap. The residue is distilled under about 0.1 mm. of Hg pressure and condensed in a receiver cooled in Dry Ice-acetone. Redistillation gives 82.4 parts of substantially pure nitrosyl trifluoroacetate boiling at about $47°$ C. at 94 mm. of Hg pressure. The yield is 92.5 percent of theoretical.

*Analysis.*—Calculated for $C_2F_3NO_2$: C, 16.8%; F, 39.8%; N, 9.7%. Found: C, 17.0%; F, 39.3%; N, 8.8%.

*Example 2*

The procedure set forth in Example 1 is repeated, employing 30 parts (0.058 mole) of silver perfluorooctanoate and 35 parts (0.54 mole) of nitrosyl chloride, carrying out the reaction for 2 hours at about $-20°$ C.

Nitrosyl perfluorooctanoate thus obtained in substantially pure form is a yellowish liquid boiling in the range of $55°$ to $60°$ C. at about 1.5 mm. Hg. A yield of 23.2 parts (90 percent of theoretical) is obtained.

*Example 3*

When the above procedure is repeated employing the silver salts of perfluoropropanoic acid and perfluorododecanoic acid the products are found to be respectively nitrosyl perfluoropropanoate, B.P. $50°$ C. at about 50 mm. Hg, and nitrosyl perfluorododecanoate, boiling at about $90°-95°$ C. at 0.5 mm. Hg.

*Example 4*

A vessel provided with stirrer, an acetone-Dry Ice cooled cold finger condenser and provision for the anhydrous addition of solids is mounted in a bath of acetone-Dry Ice. The vessel is then charged with 176 parts (2.7 moles) of nitrosyl chloride. Stirring is commenced and 104 parts (0.164 mole) of solid lead (II) perfluorobutyrate are added in portions over a period of about 10 minutes. After all of the lead salt has been added, the flask is stoppered, the cooling bath is removed and the reaction mixture is heated to reflux with stirring for 4 hours. After standing overnight (about 16 hours) in an acetone-Dry Ice bath, the cooling bath is again removed so that the reaction mixture refluxes and about 200 parts by volume of trichlorofluoromethane are added. The mixture is filtered under 2–3 pounds of nitrogen pressure in a sintered glass pressure funnel, to remove lead (II) chloride. The time of filtration is reduced if the lead salts are allowed to settle and the bulk of the solution is decanted before the fine precipitate is transferred to the funnel.

The excess nitrosyl chloride and solvent are distilled off using a water bath maintained at about $20°$ to $25°$ C. to heat the vessel. The receiver is then changed and the residue is distilled under vacuum. Nitrosyl perfluorobutyrate is obtained as a yellow liquid boiling at $43°$ C. at 20 mm. Hg. The yield is 72 parts, about 90 percent of theoretical.

*Analysis.*—Calculated for $C_4F_7NO_3$: C, 19.8%; F, 54.7%; N, 5.76%. Found: C, 20.4%; F, 55.1%; N, 5.4%.

The process works satisfactorily when nitrosyl bromide is employed in place of nitrosyl chloride, in approximately the same molar amounts.

Additional examples of nitrosyl perfluoroacylates and starting acids of the formula $R_fCOOH$ useful for the purposes of the invention are set forth in the following table. The procedure used in the reaction is in each case that set forth above in Example 1, an excess of the nitrosyl chloride being used. The boiling points are uncorrected.

| Perfluoroalkanoic acid (used as the silver salt) | Nitrosyl perfluoroacylate obtained | B.P., °C. (mm.) |
|---|---|---|
| $C_5F_{11}COOH$ | $C_5F_{11}COONO$ | 65/10 |
| $C_4F_9COOH$ | $C_4F_9COONO$ | 51/10 |
| $C_9F_{19}COOH$ | $C_9F_{19}COONO$ | 68/1 |

*Example 5*

The production of perfluoronitrosyl acylates having the general formula:

$$R_fO\text{—}CF_2CF_2COONO$$

wherein $R_f$ is an alkyl radical having from 1 to 8 carbon atoms is carried out as follows. The acids and their silver, lead or mercury salts, are prepared by the methods described in United States Patent 2,713,595.

A round bottomed flask provided with a magnetic stirrer, a provision for the anhydrous addition of solids and an outlet protected by a drying tube is mounted in a Dry Ice-acetone bath. After the flask has been flushed with dry nitrogen, it is charged with 42.6 grams (0.65 mole) of nitrosyl chloride and 34.5 grams (0.0892 mole) of the silver salt of perfluoro(β-ethoxypropionic) acid are then added thereto in portions over a period of about 10 minutes, while stirring. The reaction mixture is stirred at a temperature in the range of about $-20°$ C. to $-40°$ C. for about 2 hours. The reaction mixture is thereafter permitted to warm to room temperature, during which time the excess of nitrosyl chloride distils over into a Dry Ice cooled trap. The residue remaining in the reaction flask is then distilled fractionally under reduced pressure, and 27 grams (a yield of 97.7 percent of theoretical) of nitrosyl perfluoro β-ethoxypropionate, boiling at $44°$ C. at 14 millimeters of mercury, are received.

Further examples of the perfluoronitrosyl acylates characterized by the presence of an ether oxygen are set forth in the following table showing the starting material and the products obtained. The process is that set forth above, in which an excess of the nitrosyl chloride is used. The temperatures employed are the same. The boiling points given are uncorrected.

TABLE II

| Polyfluoro acid (employed as silver salt) | Nitrosyl perfluoroacylate obtained | B.P., °C. (mm.) |
|---|---|---|
| $CF_3OC_2F_4COOH$ | $CF_3OC_2F_4COONO$ | 55/20 |
| $n\text{-}C_3F_7OC_2F_4COOH$ | $n\text{-}C_3F_7OC_2F_4COONO$ | 63/10 |
| $n\text{-}C_5F_{11}OC_2F_4COOH$ | $n\text{-}C_5F_{11}OC_2F_4COONO$ | 53/1.5 |
| $n\text{-}C_6F_{13}OC_2F_4COOH$ | $n\text{-}C_6F_{13}OC_2F_4COONO$ | 56/1 |
| $n\text{-}C_8F_{17}OC_2F_4COOH$ | $n\text{-}C_8F_{17}OC_2F_4COONO$ | 73/1 |

*Example 6*

Acids corresponding to the formula:

$$ZCFCl(CF_2\text{—}CFCl)_mCF_2COOH$$

wherein Z and $m$ have the significance set forth hereinabove can be prepared according to the procedures set forth in United States Patent 2,806,866, and their salts, including their silver salts, are prepared by the procedures set forth in United States Patent 2,806,867. Acids having a chlorine atom on the carbon atom adjacent to the carboxyl group are prepared by the method described in United States Patent 2,863,916.

The process set forth in Example 5 is carried out, employing 44.9 grams (0.127 mole) of the silver salt of 3,4-dichloropentafluorobutyric acid and 57 grams (0.87 mole) of nitrosyl chloride. There are recovered from the reaction mixture 31 grams (88.5 percent of theoretical) of nitrosyl 3,4-dichloropentafluorobutyrate, boiling at about 53° C. at about 1.5 millimeters of mercury.

This procedure is repeated using 26.8 grams (0.057 mole) of the silver salt of 3,5,6-trichlorooctafluorocaproic acid, and 57 grams of nitrosyl chloride, whereupon 20 grams of nitrosyl 3,5,6-trichlorooctafluorocaproate, boiling about 73° C. at about 0.5 millimeter of mercury, are obtained. The yield is 89.4 percent of theoretical.

Further examples of polyfluoronitrosyl acylates of this type, and the starting materials therefor, are set forth in the following table. The reaction procedure used is the same as that shown above, a large excess of nitrosyl chloride being used. The boiling points given are uncorrected.

TABLE III

| Polyfluoro acid employed (as silver salt) | Nitrosyl polyfluoro acylate obtained | B.P., ° C. (mm.) |
|---|---|---|
| $CF_2ClCFCl(CF_2CFCl)_2CF_2COOH$ | $CF_2ClCFCl(CF_2CFCl)_2CF_2COONO$ | 103/0.5 |
| $CF_2ClCFCl(CF_2CFCl)_4CF_2COOH$ | $CF_2ClCFCl(CF_2CFCl)_4CF_2COONO$ | (*) |
| $CF_2ClCF_2CFClCOOH$ | $CF_2ClCF_2CFClCOONO$ | 135/10 |

*Distils below 100° C. at very low pressures. Recover by removing solids from the reaction mixture diluted with trichlorofluoromethane or 1,1,2-trichlorotrifluoroethane and distilling off lower boiling components. The residue is sufficiently pure for the subsequent decarboxylation.

Polyfluorinated acids corresponding to the formula:

$$Z(CF_2-CFCl)_mCF_2COOH$$

wherein Z and m have the significance set forth above, are prepared by processes described in United States Patents 2,806,865 and 2,831,004; and their salts are prepared as set forth in United States Patent 2,806,867.

The polyfluoronitrosyl acylates corresponding to those acids which contain odd numbers of carbon atoms are prepared by the same procedure as that used for the even-numbered acids of this type, as described above. A large excess of nitrosyl chloride is used. High boiling products are recovered as residues.

Examples of the starting materials and the nitrosyl polyfluoroacylates thus obtained are set forth in the following table. The boiling points are uncorrected.

TABLE IV

| Polyfluoro acids (employed as silver salt) | Nitrosyl polyfluoroacylate obtained | B.P., ° C. (mm.) |
|---|---|---|
| $CCl_3-CF_2-CFCl-CF_2-COOH$ | $CCl_3-CF_2-CFCl-CF_2COONO$ | 75/0.5 |
| $CCl_3(CF_2-CFCl)_2-CF_2-COOH$ | $CCl_3(CF_2-CFCl)_2CF_2COONO$ | 100/0.5 |
| $CCl_3(CF_2-CFCl)_3-CF_2-COOH$ | $CCl_3(CF_2-CFCl)_3CF_2COONO$ | (*) |
| $CCl_3(CF_2-CFCl)_5-CF_2-COOH$ | $CCl_3(CF_2-CFCl)_5CF_2COONO$ | (*) |

*Very high boiling.

Example 7

Omega-hydroperfluoroalkanoic acids and omega-chloroperfluoroalkanoic acids corresponding to the formula:

$$X(CF_2)_nCOOH$$

wherein X represents chlorine or hydrogen and n is an integer from 1 to 12 can be prepared by the processes disclosed in U.S. Patents 2,559,629 and 2,559,630. Their silver salts, or mercury or lead salts useful in the process of the invention can be prepared by reacting these acids with silver oxide, lead oxide or mercuric oxide.

The process of Example 5 is carried out, reacting the silver salts listed in the first column of the following table with an excess of nitrosyl chloride. The same conditions of reaction are used and the compounds obtained are isolated in the manner described hereinabove. These compounds are listed in the second column of the table.

TABLE V

| Polyfluoro acid (employed as silver salt) | Nitrosyl polyfluoroacylate obtained | B.P., ° C. (mm.) |
|---|---|---|
| $H(CF_2)_6COOH$ | $H(CF_2)_6COONO$ | 57/1.5 |
| $H(CF_2)_4COOH$ | $H(CF_2)_4COONO$ | 69/10 |
| $Cl(CF_2)_4COOH$ | $Cl(CF_2)_4COONO$ | 70/10 |
| $Cl(CF_2)_6COOH$ | $Cl(CF_2)_6COONO$ | 55/1 |
| $H(CF_2)_{11}COOH$ | $H(CF_2)_{11}COONO$ | 97/1 |
| $ClF_2COOH$ | $ClCF_2COONO$ | 52/20 |

Example 8

Pyrolysis of nitrosyl polyfluoroacylates to the corresponding polyfluoronitrosoalkanes.

A 100 ml. pear-shaped flask having a nitrogen inlet extending to the bottom is connected through 1 mm. capillary tubing to a borosilicate glass tube 2 cm. in inside diameter and 28 cm. long. The capillary tubing is wrapped with heating tape. A thermocouple is attached to the outside of the pyrolysis tube which is wrapped with aluminum foil and then with heating tape. The exit gases from the pyrolysis tube are passed successively through an acetone-Dry Ice trap and two liquid air traps.

The flask is charged with about 30 ml. of nitrosyl trifluoroacetate and heated to 75°–78° C. Nitrogen gas is bubbled through the hot liquid at about 150 ml. per minute, thus carrying vapors of the nitrosyl trifluoroacetate through the pyrolysis tube which is maintained at 190° to 192° C. After 3.5 hours, 24.7 g. (0.173 mole) of nitrosyl trifluoroacetate have been vaporized and pyrolyzed. The process is then stopped and the first trap warmed to −20° C. to force the more volatile products into the liquid air traps. The contents of the liquid air traps are evaporated and bubbled through two washing towers containing 5 percent aqueous potassium hydroxide and through a drying tube and condensed in a liquid air-cooled trap. Redistillation of this material gives 9.6 g. (56 percent of theoretical, based on material vaporized) of trifluoronitrosomethane. The infrared spectrum of this blue material is identical with the spectrum of a sample of $CF_3NO$ prepared by the reaction of $CF_3I$ with NO, a known process.

When this process is repeated, using other nitrosyl polyfluoroacylates, the corresponding perfluoronitrosoalkanes are obtained. When high boiling materials are employed it is found expedient to employ reduced pressures in the pyrolysis system. Polyfluoronitrosoalkanes starting with $C_5F_{11}NO$ are liquid at the temperatures employed above and are conveniently handled by washing in separatory funnels, etc., by conventional methods. The polyfluoronitrosoalkanes are dark blue, toxic compounds.

For continuous operation, the flask in which the diluent gas stream is charged with the nitrosyl polyfluoroacylate is provided with supply means, such as a stoppered funnel or the like, by means of which the nitrosyl compound in the flask is replenished as it is used.

The nitrosyl polyfluoroacylates prepared by the processes of Examples 2 to 7 above can be pyrolyzed to form the corresponding nitroso polyfluoroalkanes by the process set forth above, using somewhat higher temperatures for obtaining the starting nitrosyl acylates in vapor form when these compounds are of higher molecular weight, as, for example, above about 6 carbon atoms chain length. The use of reduced pressure in the system also assists in carrying out the pyrolysis in the vapor phase. Isolation and recovery of the polyfluoronitroso alkanes is carried out as set forth above, with due regard for the physical characteristics of individual compounds as is well known to the art. The following table sets forth the products obtained by pyrolysis of the nitrosyl polyfluoroacylates.

polymerized with halogenated olefins, such as tetrafluoroethylene, to provide useful polymers of varying characteristics. The lower molecular weight polyfluoronitrosoalkanes tend to produce stretchy rubbers when thus copolymerized, while the polyfluoronitrosoalkanes having higher molecular weights, say above about 6 carbon atoms, yield stiffer elastomers tending toward more rigid copolymers. These copolymers are oleophobic and solvent resistant, and can be produced as sheets, to provide gaskets or sealing materials.

What is claimed is:

A polyfluorinated nitrosoalkane of the formula:

$$R_fO-(CF_2)_2-NO$$

wherein $R_f$ is a perfluoroalkyl radical having from 1 to 5 carbon atoms.

TABLE VI

| Nitrosyl Polyfluoroacrylate Employed | B.P., °C./mm. Hg | Polyfluoro Nitrosoalkane Product | B.P., °C./mm. Hg |
|---|---|---|---|
| $C_2F_5COONO$ | 57.5/79 | $C_2F_5NO$ | −42/760 |
| $C_4F_9COONO$ | 51/10 | $C_4F_9NO$ | 16/760 |
| $C_5F_{11}COONO$ | 65/10 | $C_5F_{11}NO$ | 50/760 |
| $C_8F_{17}COONO$ | 58/1 | $C_8F_{17}NO$ | 30/15 |
| $C_9F_{19}COONO$ | 68/1 | $C_9F_{19}NO$ | 45/14 |
| $C_{12}F_{25}COONO$ | 86/0.5 | $C_{12}F_{25}NO$ | 57/1.5 |
| $CF_3OC_2F_4COONO$ | 55/20 | $CF_3OC_2F_4NO$ | −10/760 |
| $C_2F_5OC_2F_4COONO$ | 44/14 | $C_2F_5OC_2F_4NO$ | 15/760 |
| $C_3F_7OC_2F_4COONO$ | 63/10 | $C_3F_7OC_2F_4NO$ | 50/760 |
| $C_5F_{11}OC_2F_4COONO$ | 53/1.5 | $C_5F_{11}OC_2F_4NO$ | 48/100 |
| $C_6F_{13}OC_2F_4COONO$ | 56/1 | $C_6F_{13}OC_2F_4NO$ | 43/20 |
| $C_8F_{17}OC_2F_4COONO$ | 73/1 | $C_8F_{17}OC_2F_4NO$ | 65/10 |
| $CF_2ClCFClCF_2COONO$ | 53/1.5 | $CF_2ClCFClCF_2NO$ | 65/760 |
| $CF_2ClCFCl(CF_2CFCl)_2CF_2COONO$ | 73/0.5 | $CF_2ClCFClCF_2CFClCF_2NO$ | 51/10 |
| $CF_2ClCFCl(CF_2CFCl)_4CF_2COONO$ | 103/0.5 | $CF_2ClCFCl(CF_2CFCl)_2CF_2NO$ | 65/1 |
| $CCl_3CF_2CFClCF_2COONO$ | (*) | $CF_2ClCFCl(CF_2CFCl)_4CF_2NO$ | (*) |
| $CCl_3(CF_2CFCl)_2CF_2COONO$ | 75/0.5 | $CCl_3CF_2CFClCF_2NO$ | 51/10 |
| $CCl_3(CF_2CFCl)_3CF_2COONO$ | 100/0.5 | $CCl_3(CF_2CFCl)_2CF_2NO$ | 57/1 |
| $CCl_3(CF_2CFCl)_5CF_2COONO$ | (*) | $CCl_3(CF_2CFCl)_3CF_2NO$ | 78/0.5 |
| $H(CF_2)_6COONO$ | (*) | $CCl_3(CF_2CFCl)_5CF_2NO$ | (*) |
| $H(CF_2)_7COONO$ | 57/1.5 | $H(CF_2)_6NO$ | 90/760 |
| $H(CF_2)_{11}COONO$ | 69/10 | $H(CF_2)_7NO$ | 30/760 |
| $Cl(CF_2)_4COONO$ | 97/1 | $H(CF_2)_{11}NO$ | 54/1.5 |
| $Cl(CF_2)_6COONO$ | 70/10 | $Cl(CF_2)_4NO$ | 60/760 |
| $ClCF_2COONO$ | 55/1 | $Cl(CF_2)_6NO$ | 55/80 |
| $CF_2ClCF_2CFClCOONO$ | 52/20 | $ClCF_2NO$ | −35/760 |
|  | 135/10 | $CF_2ClCF_2CFClNO$ | 50/10 |

*Distils below 100° C. at very low pressures. Short-path or molecular distillation is useful for purification When nitrosyl trifluoroacetate or nitrosyl perfluorobutyrate are allowed to fall dropwise into about 30 ml. of tri(perfluorobutyl) amine heated to about 170° C. and contained in a flask provided with a dropping funnel and a reflux condenser, pyrolysis of these compounds takes place in the hot, inert fluid. The reactant is effectively diluted by the hot liquid, in which it is soluble, thus preventing explosive or uncontrollable reaction. The gaseous products are collected by means of a liquid air trap and Dry Ice trap connected by glass tubing to the top of the reflux condenser, and the products recovered as set forth above. There are obtained trifluoronitrosomethane and heptafluoronitrosopropane, respectively.

Other high-boiling inert liquids can also be used as diluents for the purpose described, and need only be inert toward the reactants and the products of reaction. The boiling points of such inert liquid diluents must of course be higher than the temperatures used for pyrolysis. The inert diluents may be solvents for the nitrosyl polyfluoroacylates, but if they are not, agitation of the hot fluid accomplishes the desired dilution in that dispersion of the reactant takes place.

The polyfluoronitrosoalkanes thus prepared can be co-

References Cited

UNITED STATES PATENTS

| 1,086,294 | 2/1914 | Hefti | 260—545 |
| 1,098,938 | 6/1914 | Callsen | 260—545 |
| 2,949,490 | 8/1960 | Pieper et al. | 260—647 |
| 3,009,965 | 11/1961 | Mueller et al. | 260—647 |
| 3,083,237 | 3/1963 | Haszeldine | 260—647 |

OTHER REFERENCES

Banks et al.: Proc. Chem. Soc. (London), February 1961, pages 64–65.

Haszeldine (II), Nature, vol. 168 (1951), pp. 1028–1029, Q¹N2.

Haszeldine (III), Jour. Chem. Society (1953), pp. 4172–4173 QD¹C6.

Lovelace et al.: Aliphatic Fluorine Compounds, pp. 290–292 (1958).

LEON ZITVER, *Primary Examiner.*

CHARLES B. PARKER, *Examiner.*

R. K. JACKSON, B. HELFIN, *Assistant Examiners.*